United States Patent
Skogvall

(10) Patent No.: US 10,626,023 B2
(45) Date of Patent: Apr. 21, 2020

(54) METHOD AND APPARATUS TO REDUCE WASTE PRODUCTION IN AN ISOLATION PROCESS

(71) Applicant: Pharmalundensis AB, Lund (SE)

(72) Inventor: Staffan Skogvall, Lund (SE)

(73) Assignee: Pharmalundensis AB, Lund (SE)

( * ) Notice: Subject to any disclaimer, the term of this patent is extended or adjusted under 35 U.S.C. 154(b) by 0 days.

(21) Appl. No.: 15/772,484

(22) PCT Filed: Nov. 1, 2016

(86) PCT No.: PCT/EP2016/076305
§ 371 (c)(1),
(2) Date: Apr. 30, 2018

(87) PCT Pub. No.: WO2017/076835
PCT Pub. Date: May 11, 2017

(65) Prior Publication Data
US 2018/0327277 A1 Nov. 15, 2018

(30) Foreign Application Priority Data
Nov. 2, 2015 (SE) ........................................ 1551412

(51) Int. Cl.
*C02F 1/04* (2006.01)
*B01D 1/18* (2006.01)
(Continued)

(52) U.S. Cl.
CPC ................ *C02F 1/048* (2013.01); *B01D 1/16* (2013.01); *B01D 1/18* (2013.01); *B01D 7/02* (2013.01); *C02F 1/042* (2013.01)

(58) Field of Classification Search
CPC ... B01D 1/16; B01D 1/18; B01D 1/26; B01D 7/02; B01D 2221/10; B01D 2257/91;
(Continued)

(56) References Cited

U.S. PATENT DOCUMENTS 3,733,617 A * 5/1973 Bennett .................... B63J 4/006
4/315
4,045,314 A 8/1977 Rod et al.
(Continued)

FOREIGN PATENT DOCUMENTS

EP 0637568 2/1995
EP 2052940 4/2009
(Continued)

OTHER PUBLICATIONS

Written Opinion issued by the EPO in PCT/EP2016/076305, dated Dec. 16, 2016.
(Continued)

*Primary Examiner* — Jonathan Miller
*Assistant Examiner* — Gabriel E Gitman
(74) *Attorney, Agent, or Firm* — Moser Taboada

(57) ABSTRACT

There is disclosed a method and an apparatus for reducing the amount of waste, requiring special handling and possible destruction, in a process involving vaporization, in an evaporator apparatus (1-6, V1-V6), of a water solution containing environmentally hazardous substances. A considerable amount of the water content of said water solution is vaporized in a reusable vaporization chamber (2a). At a certain time, the vaporization process is stopped, so that the remaining water content is 70% to 5% of the initial water content. Thereafter, in a second step, the remaining water solution in the reusable vaporization chamber (2a) is transferred into a separate waste isolating container (6), where the remaining water is subjected to at least one further water-reducing process. The remaining waste, including the environmentally hazardous substances, is left in the waste container for separate handling and possible destruction.

24 Claims, 1 Drawing Sheet

(51) Int. Cl.
*B01D 7/02* (2006.01)
*B01D 1/16* (2006.01)

(58) Field of Classification Search
CPC .... C02F 1/042; C02F 1/048; C02F 2101/305; C02F 2103/003; C02F 2103/343
See application file for complete search history.

(56) References Cited

U.S. PATENT DOCUMENTS

| | | | |
|---|---|---|---|
| 4,102,322 A | 7/1978 | Doner | |
| 4,132,640 A | 1/1979 | Filzmoser | |
| 5,009,172 A * | 4/1991 | Koga | F23G 7/001 110/242 |
| 5,400,443 A * | 3/1995 | Marino | E03D 11/11 4/111.5 |
| 6,101,638 A * | 8/2000 | Hammond | A47K 11/023 4/111.1 |
| 6,442,768 B1 * | 9/2002 | Hammond | A47K 11/023 4/111.1 |
| 7,001,512 B1 | 2/2006 | Newsome | |
| 2012/0055777 A1 | 3/2012 | Fima | |
| 2014/0083627 A1 * | 3/2014 | Khan | B01D 1/0082 159/4.01 |

FOREIGN PATENT DOCUMENTS

| | | |
|---|---|---|
| SE | 1750620-5 | 11/2015 |
| SE | 539233 | 5/2017 |
| WO | 2005/115211 | 12/2005 |
| WO | 2005/073136 | 8/2006 |
| WO | 2017/076745 | 5/2017 |

OTHER PUBLICATIONS

Article 34 Amendment filed in PCT/EP2016/076305, dated Sep. 29, 2017.
English translation of Office Action issued by the Swedish Patent and Registration Office in SE-21090954, dated Dec. 20, 2017.
International Preliminary Report on Patentability issued by the EPO in PCT/EP2016/076305, dated Feb. 21, 2018.
Extended European Search Report issued by the EPO in EP Application No. 17 16 8607, dated Jul. 14, 2017.
International Search Report and Written Opinion issued by the EPO in PCT/EP2017/060159, dated Jan. 24, 2018.

* cited by examiner

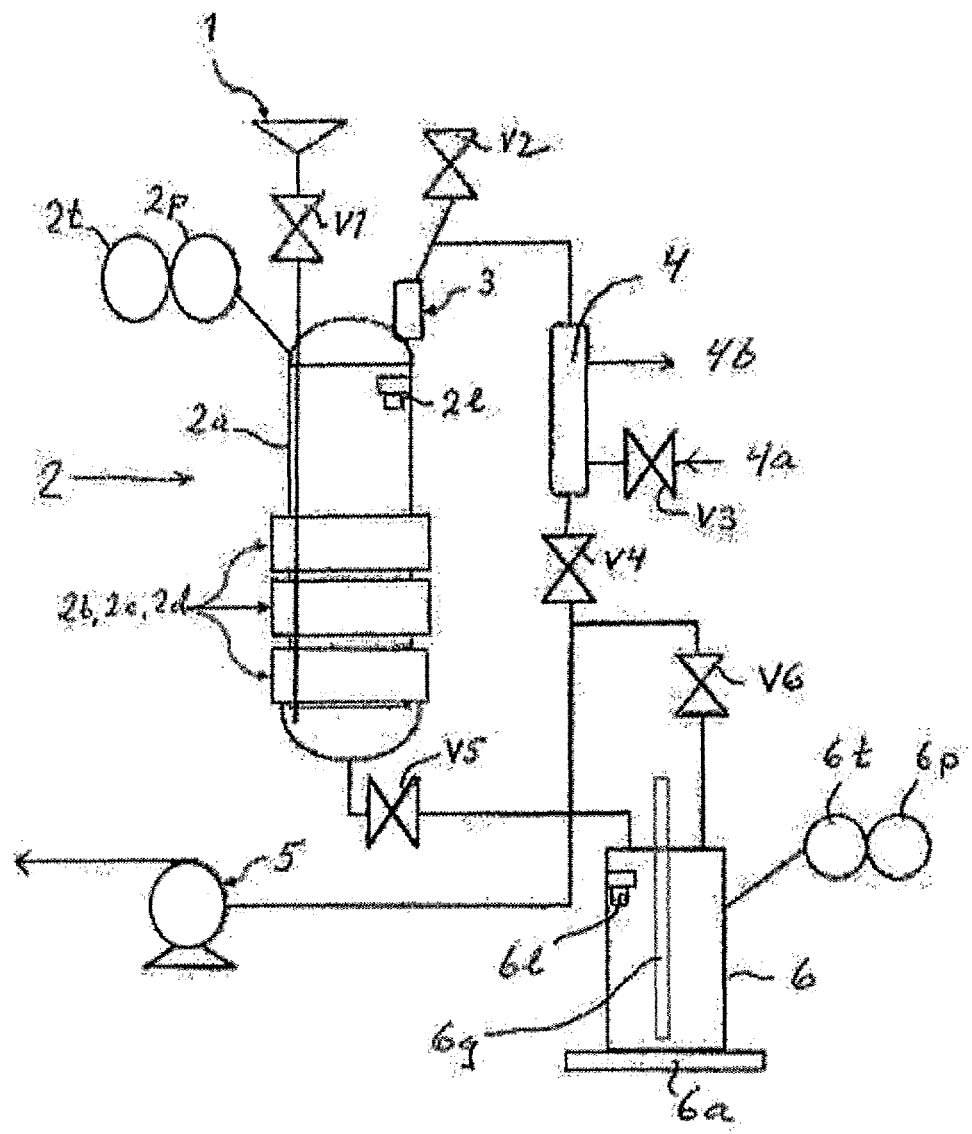

METHOD AND APPARATUS TO REDUCE WASTE PRODUCTION IN AN ISOLATION PROCESS

This application is a national phase of PCT/EP2016/076305, filed Nov. 1, 2016, and claims priority to SE Patent Application No. 1551412-8, filed Nov. 2, 2015, now SE Patent No. 539233, the entire contents of both of which are hereby incorporated by reference.

FIELD OF THE INVENTION

The present invention relates to a method and an apparatus for reducing the amount of waste, requiring special handling and possible destruction, produced in an isolation process involving vaporization, in an evaporator apparatus, of a water solution containing environmentally hazardous substances, wherein
  a considerable amount of the water content is vaporized in at least one reusable vaporization chamber,
  the water content of said water solution is vaporized into vapor, which is released, possibly after condensation into water, to an ambient system, and
  the vaporization process is stopped at a certain time, at which the remaining water solution is removed from said at least one reusable vaporization chamber for further processing.

BACKGROUND OF THE INVENTION

Generally, there are several types of substances that may be unsuitable or harmful in the environment (environmentally hazardous substances). Some may be harmful to animals via a specific mechanism (such as hormones that may influence the normal reproduction of marine animals), others may be generally toxic (such as cytostatic drugs) while, in the case of antibiotics and antiviral drugs, there may be an increased risk for development of resistant bacteria and viruses if the environment contains antibiotics and antiviral drugs for a substantial amount of time. Environmentally hazardous substances include antibiotics, antifungal and antiviral drugs, NSAID (non-steroid anti-inflammatory drugs), cytostatic drugs, hormones (such as steroid hormones), antidepressants, antipsychotics, and many other pharmaceutical or non-pharmaceutical substances.

Today, much pharmaceutical and biotech research is performed on cells from cultures that grow for a varying amount of time in a medium. In order to prevent bacterial infections which can destroy cell cultures, various types of antibiotics are often added to the growth medium. See "The prophylactic use of antibiotics in cell culture", Ingrid Kuhlmann, Cytotechnology (1995), pp 95-105. When the cell culture is discarded, it is important to prevent that the antibiotics from the cell culture is released to the environment, which could enhance development of antibiotic resistant bacteria. This may be achieved by heating of the growth medium during autoclaving, if the substances being used are thermosensitive. However, many antibiotics and other hazardous substances are not sufficiently de-graded by this process, and it may therefore be necessary to incinerate the substances in a high temperature oven instead. This can be problematic e.g. in a research institute that can generate very substantial amounts of liquid polluted with antibiotics every day. The disposal of large quantities of waste such as growth media and other liquids with environmentally hazardous substances such as antibiotics to suitable high temperature incinerators can result in high financial costs as well as logistic problems. Therefore, it is desirable to reduce the amount of waste that has to be destroyed to a minimum.

The process of vaporization is widely used to concentrate foods and chemicals as well as to salvage solvents. A solution containing the desired product is fed into the evaporator and passes across a heat source in a reusable vaporization chamber. The applied heat converts the water in the solution into vapor. The vapor is removed from the rest of the solution and is normally condensed before being released, while the now-concentrated solution is either fed into a second evaporator or is removed. An evaporator apparatus used in the present invention generally consists of four units:
  a liquid receiving unit for receiving the water solution,
  at least one reusable vaporization chamber for heating the water solution so as to vaporize water from said water solution,
  a vapor evacuation unit, and
  a vapor releasing unit, e.g. a condensation unit, which is connectable to an ambient system, such as a sewage system, for releasing vapor or condensed water during the vaporization process.

Evaporators can also be used to isolate environmentally hazardous substances which are dissolved in water solutions. An initial vaporization process removes much, but not all, of the water. The removed vapor, or water if a condensation unit is used, can be released into an ambient system, e.g. directly into the ambient air, a sewage system, a water tank or even a ditch. The remaining solution in the reusable vaporization chamber contains the hazardous substances, and can subsequently be taken care of for instance by destruction in an incinerator. This eliminates a potential environmental hazard.

However, there are considerable problems with this method.

Vaporization of the water solution results in fouling with hard deposits on the surfaces of the vaporization chamber, especially when a large portion of the liquid has been vaporized and the concentration of the solvents therefore has increased. It may require costly and labor-intensive cleaning to remove these deposits, or it may even require a replacement of the soiled unit. Another problem with removing much water in the reusable vaporization chamber is that the viscosity of the water solution will gradually increase, which will make it increasingly difficult to transfer the water residue to a waste container. Therefore, before all of the water has been vaporized in the vaporization chamber, the vaporization process is stopped at a certain time, at which the remaining solution in the evaporator is removed from the reusable vaporization chamber for handling as waste and possible destruction. Accordingly, the present method of isolation of substances that are dissolved in water solutions necessarily results in the production of considerable amounts of waste material, which is uneconomic and causes logistical problems.

OBJECT OF THE INVENTION

Against this background, the object of the invention is to substantially reduce the amount of waste that is produced when environmentally hazardous substances are isolated from water solutions using vaporization. The reusable vaporization chamber of the evaporator apparatus should preferably be reusable for a number of further vaporization processes.

SUMMARY OF THE INVENTION

The method according to the invention involves a two-stage or multi-stage removal of water from a water solution with dissolved environmentally hazardous substances, with the intention of isolating and possibly destroying the dissolved substances, with the first removal of water occurring in one or a number of reusable evaporators and the final removal of water occurring in one or more waste isolating containers. The advantage of performing the final reduction of water in a waste isolating container is that at this point it does not matter if dissolved substances cause deposits on the walls, and the water solution has a high viscosity, because this container is not reusable, but is instead normally sent for destruction.

This two-stage or multi-stage reduction with the final reduction of water occurring in the waste isolating container will substantially reduce the total production of waste from the evaporator apparatus.

According to the present invention, a method and an evaporator apparatus are provided that will substantially reduce the amount of produced waste containing environmentally hazardous substances, wherein:

said certain time, at which the first removal of water occurring in one or a number of reusable evaporators is stopped, is adjusted so that the water content is reduced by 30% to 95%, and the remaining water content is 70% to 5% of the initial water content, the remaining water content resulting in the formation of only minor deposits in said at least one reusable vaporization chamber, and allowing an easy removal of the remaining water solution (waste) from the reusable vaporization chamber, said remaining water solution (waste), at said certain time, is transferred from said reusable vaporization chamber into at least one waste isolating container, whereupon said remaining water solution (waste) in said at least one waste isolating container is subjected to at least one further water-reducing process, where the water content in said at least one waste isolating container is further reduced by 10% to 100%, the combined water-reduction in said at least one reusable vaporization chamber and said at least one waste isolating container being such as to leave a final water content in said at least one waste isolating container of 10% to 0% of the initial water content of said water solution containing environmentally hazardous substances, and the remaining waste in said at least one waste isolating container, including said environmentally hazardous substances, is left in said separate waste isolating container for separate handling and possible destruction.

The term "reusable" vaporization chamber depicts that the vaporization chamber is refilled at least once to be used during two or more vaporization processes before being discarded.

A somewhat similar process is disclosed in the document U.S. Pat. No. 4,132,640 (von Rool AG). This system will provide for processing a water solution containing salt and organic substances. The water solution is fed into an evaporator, which will remove water vapor. The remainder is led to a spray dryer, where hot flue gases will cause a further vaporization. The separated substance is then led to a combustion chamber forming part of a continuously operating system. The resulting flue gases are fed via a pipe to a boiler and then to a filter, from which the gases are discharged into the atmosphere through a pipe and a chimney. Accordingly, this prior art system is an integrated evaporization and combustion system, and there is no isolation of the waste in a replaceable waste isolating container, as in the present invention.

BRIEF DESCRIPTION OF THE DRAWING

The invention will now be described in more detail with reference to the appended drawing with a single FIGURE showing schematically an evaporator apparatus according to the present invention.

DETAILED DESCRIPTION OF A PREFERRED EMBODIMENT OF THE INVENTION

The evaporator apparatus used in a preferred embodiment of this invention comprises a liquid receiving unit 1, an inlet valve V1, a vaporization unit 2 provided with a vaporization chamber 2a, a number of heating elements 2b, 2c, 2d placed outside but in contact with the metal walls of the chamber 2a, sensors 2t, 2p, 21 for determining the temperature, pressure and level of contents in the vaporization chamber, respectively, a vapor evacuation unit 3 with an associated valve V2, a vapor condensation unit 4 provided with a cooling water inlet 4a, an associated valve V3 and a cooling water outlet 4b, an outlet valve V4, and a pump 5 for reducing the pressure below the atmospheric pressure in the vaporization chamber 2a. In principle, these components form a prior art evaporator apparatus. As is also previously known, there may be at least one further reusable vaporization chamber (not shown) in the vaporization unit 2 for removal of liquid in consecutive steps.

According to the invention, at least one waste isolating container 6 is connected, via a valve V5, to the vaporization chamber 2a. This waste isolating container 6 (or two or more waste isolating containers to be used one at a time, possibly after switching the connection) is used for receiving waste generated in the vaporization unit 2, and in this waste isolating container further water is removed from the waste material. The waste isolating container is also connectable to the pump 5 via a valve V6. The waste isolating container 6 is used only until the waste has reached a specified level, at which time the waste isolating container is considered to be full and is replaced. At this point the waste isolating container will be taken away from the evaporator apparatus and normally sent to destruction, e.g. in an incinerator or high temperature oven (not shown).

The apparatus operates as follows below, it being understood that a computer (not shown) is used to control the whole process on the basis of signals received from various sensors, e.g. the above-mentioned temperature sensor 2t, pressure sensor 2p and level sensor 21, preferably disposed inside the vaporization chamber 2a, and a temperature sensor 6t, a pressure sensor 6p and a level sensor 61, preferably disposed in the waste isolating container 6, and also on the basis of control signals being sent to the various valves V1, V2, V3, V4, V5 and V6. In addition, one or more pumps are used to move the water solutions to the appropriate compartment, as well as being able to reduce the ambient pressure in the vaporization chamber 2a and the waste isolating container 6 to facilitate formation of water vapor through vaporization.

A batch of a water solution, containing environmentally hazardous substances, such as antibiotics or other hazardous substances, is fed into the liquid receiving unit 1 and to the reusable vaporization chamber 2a. There, the water solution is heated by the heating elements 2b, 2c, 2d so that water will vaporize and form vapor in the vaporization chamber 2a.

The vapor is evacuated via the vapor evacuation unit 3. Thereafter, the vapor is circulated through the vapor condenser unit 4 by means of the pump 5. The condensed water is released into a regular sewage system, a water tank or even a ditch. Alternatively, the vapor can be let out for instance into the ambient air or into a water tank or to the sewage system without first being condensed into water.

The level sensor 21 detects the amount of water solution containing environmentally hazardous substances that is fed into the evaporator, and the vaporization process is continued, by means of the heating elements 2b, 2c, 2d, until the desired percentage of water has been removed from the solution.

The vaporization process in the vaporization chamber is stopped at an optimum time, when the remaining water content is still high enough to secure that there is a sufficient fluidity of the solution and that there is only a small tendency for formation of deposits on the walls of the vaporization chamber 2a, but the water content being as small as possible. The tendency to form deposits on the walls of the vaporization chamber differs between different water solutions, and has to be determined in preliminary examinations for all water solutions that are fed into the evaporator. At the optimum time, the vaporization process in the vaporization unit 2 is stopped, and the remaining, more concentrated water solution is transferred via the valve V5 to the waste container 6. Here, the water content of the water solution is reduced further, preferably by means of a heating plate 6a, possibly provided with a thermostat (not shown) set at a desired temperature, placed underneath the waste isolating container 6. The further reduction of water in the waste isolating container is continued until 10% to 100% of the remaining water content has been removed.

Alternatively, there may be many other ways to heat the contents in both the vaporization chamber and the waste isolating container, including using heating elements at least partially immersed in the liquid, microwaves, induction and many more ways.

The pump 5, or some other device for reducing the pressure in the vaporization chamber, and/or in the waste isolating container, will make it possible for the contents in the vaporization chamber, and/or the waste isolating container, to boil at temperatures below 100° C. by creating a below-atmospheric pressure.

The water content in the waste isolating container can be reduced also without boiling. By simply adding heat energy to its liquid, vaporization will be enhanced by evaporation, even if there is no boiling.

In the first liquid-reduction step occurring in one or more reusable vaporization chamber(s), preferably 30% to 95% of the liquid is removed, more preferably 50-95% of the liquid is removed, most preferably 70-95% of the liquid is removed, and in the final liquid-reduction step that occurs in one or more waste isolating container(s), preferably another 10% to 100%, more preferably 30% to 100% and most preferably 50% to 100% of the liquid in the waste isolating container is removed.

An additional way to increase the vaporization of water from the waste isolating container is to apply a below-atmospheric pressure in it for instance by use of a pump 5.

A further way to enhance the vaporization of water from the waste isolating container is to feed a gas into the waste isolating container via a gas inlet 6g, e.g. by bubbling a gas, such as air, into the liquid of the waste isolating container, either at atmospheric pressure or below atmospheric pressure.

As is described in Examples 1 and 2 below, this final reduction of water in the waste isolating container results in a very substantial reduction of produced waste material from the evaporator apparatus.

In the reusable vaporization chamber of the evaporation apparatus, it is advantageous to make sure that no liquid droplets, containing the potentially environmentally hazardous substances, will pass on to the evacuation unit 3 and the vapor condensing unit 4. This can be achieved by arranging a protective structure which is permeable to water vapor but which will capture any liquid droplets, as described in the co-pending PCT-application No. PCT/EP2016/075957.

Example 1

The method and apparatus according to the invention has been tested with some different types of liquids, viz.:
Dulbecco's Modified Eagle's Medium with Penicillin 120 microgram and Streptomycin 100 microgram (Sigma-Aldrich).
Dulbecco's Phosphate Buffered Saline with Penicillin 120 microgram and Streptomycin 100 microgram (Sigma-Aldrich).
Human urine with Ciprofloxacine (Sigma-Aldrich) 10 mg/liter.

During vaporization in the reusable vaporization chamber 2a, it was found that removal of gradually more water resulted in more and more fouling of the walls. A reduction of more than 30% of the water of the tested liquids, resulted in some soiling on the walls of the vaporization chamber. Removal of more than 50% of the water, resulted in more pronounced fouling, removal of more than 70% of the water, resulted in even more pronounced fouling and removal of more than 90% of the water, resulted in an additional amount of even more pronounced fouling. Furthermore, removal of more than 90% of the water led to an increased viscosity of the tested liquids, and when more than 95-97% of the water had been removed, it was virtually impossible to transfer the waste from the vaporization chamber to the separate waste isolating container.

In order to further reduce the amount of waste material, additional water was removed in the waste isolating container. The removal in the waste isolating container of 10% of the water in the liquid waste from the vaporization chamber resulted in some fouling on the walls and bottom of the waste isolating container. The removal in the waste isolating container of 40% of the water in the liquid waste from the vaporization chamber resulted in large fouling on the walls and bottom of the waste isolating container. Even further removal of water transformed the liquid waste into a hard, non-liquid material. In general, it was possible to reduce the volume of the waste from the vaporization chamber by 80% or even more by this final liquid-reducing step in the waste isolating container.

Example 2

100 liters of urine containing the antibiotic Ciprofloxacine (10 mg/liters, Sigma Aldrich) was transferred to a reusable vaporization chamber and heated. When the volume had been reduced by about 90% through vaporization, the remaining 10 liters of urine containing antibiotics were transferred to a waste isolating container. Here, all of the remaining water was removed by the use of heat, by applying a pressure lower than the ambient air pressure and by feeding a gas into the waste isolating container. As a result, the remaining urine turned into solid deposits on the walls and the bottom of the waste isolating container, and the volume of the waste was reduced by about 80%.

The invention claimed is:

1. A method to reduce an amount of waste, in a process involving a vaporization in an evaporator apparatus of an initial water solution containing environmentally hazardous substances, wherein
a portion of the water content of said initial water solution is vaporized to produce a remaining water solution and a vapor, by heating said water solution in at least one reusable vaporization chamber in a first vaporization process;
the portion of the water content of said initial water solution vaporized into the vapor is released to an ambient system, wherein the vapor is optionally condensed into liquid water before being released;
the first vaporization process is stopped at a certain time at which the remaining water solution is removed from said at least one reusable vaporization chamber for further processing, wherein said certain time is defined as the length of time of said first vaporization process, wherein said certain time is adjusted so that the water content in said at least one reusable vaporization chamber is reduced, in said first vaporization process, by 30% to 95%, and the remaining water content of the remaining water solution is 70% to 5% of the initial water content in said initial water solution;
said remaining water solution is removed at said certain time from said at least one reusable vaporization chamber into at least one separate waste isolating container;
whereupon said remaining water solution in said at least one waste isolating container is subjected to at least one further water-reducing process by heating to produce a remaining waste, where the water content in said at least one waste isolating container is reduced by 10% to 100%;
the combined water-reduction in said first vaporization process and said further water-reducing process yields a final water content in said at least one waste isolating container of 10% to 0% of the water content of said initial water solution containing environmentally hazardous substances;
the remaining waste in said at least one waste isolating container, including said environmentally hazardous substances, is left in said at least one waste isolating container for handling as waste;
when the waste has reached a specified fill level in the at least one waste isolating container, the at least one waste isolating container is taken away and replaced; and
the at least one waste isolating container containing the remaining waste is subjected to a destructive treatment, such as incineration.

2. The method according to claim 1, wherein, in said first vaporization process in said at least one reusable vaporization chamber, the water content is reduced by 50% to 95%, so that the remaining water content is 50% to 5% of the initial water content.

3. The method according to claim 1, wherein, in said further water-reducing process in said at least one waste isolating container, the water content is further reduced by 30% to 100%, the combined water-reduction in said at least one reusable vaporization chamber and said at least one waste isolating container yields a final water content in said at least one waste isolating container of 5% to 0% of the initial water content in said at least one reusable vaporization chamber.

4. The method according to claim 1, wherein, in said further water-reducing process in said at least one waste isolating container, the remaining water solution is boiled.

5. The method according to claim 1, wherein, in said further water-reducing process in said at least one waste isolating container, vaporization is enhanced by applying a pressure lower than the ambient air pressure in said at least one waste isolating container.

6. The method according to claim 1, wherein, in said further water-reducing process in said at least one waste isolating container, vaporization is enhanced by feeding a gas into said at least one waste isolating container.

7. The method according to claim 1, wherein said initial water solution contains at least cells, a growth medium, and one or more of said environmentally hazardous substances such as antibiotics.

8. The method according to claim 1, wherein said initial water solution comprises urine with one or more dissolved antibiotics and/or one or more antibiotic residues.

9. A method for handling environmentally hazardous substances present in an initial water solution, said method comprising:
in a first vaporization process, using at least one reusable vaporization chamber, reducing the water content of the initial water solution containing environmentally hazardous substances, for producing a water-reduced water solution containing said environmentally hazardous substances;
transferring the water-reduced water solution containing said environmentally hazardous substances to at least one waste container;
further reducing the water content of the water-reduced water solution present in the at least one waste container, for producing a further water-reduced waste material in the waste container;
retaining the further water-reduced waste material containing said environmentally hazardous substances in the at least one waste container; and
subjecting the at least one waste container containing the further water-reduced waste material to a destructive treatment.

10. The method as claimed in claim 9, wherein said environmentally hazardous substances comprise medical substances.

11. The method as claimed in claim 9, wherein said initial water solution comprises urine with one or more antibiotics and/or one or more antibiotic residues dissolved therein.

12. The method as claimed in claim 9, wherein during the step of further reducing the water content of the water-reduced water solution, the water content is further reduced by 30% to 100% in the at least one waste container.

13. The method as claimed in claim 12, wherein during the step of further reducing the water content of the water-reduced water solution, the water content is further reduced by 10% to 100% in the at least one waste container.

14. The method as claimed in claim 9, wherein the water content is reduced by 30% to 95% in the at least one reusable vaporization chamber.

15. The method as claimed in claim 14, wherein the water content is reduced by 50% to 95% in the at least one reusable vaporization chamber.

16. The method as claimed in claim 9, wherein the combined water reduction in the at least one reusable vaporization chamber and the at least one waste container is 90% to 100%.

17. The method as claimed claim 16, wherein the combined water reduction in the at least one reusable vaporization chamber and the at least one waste container is 95% to 100%.

18. The method as claimed in claim 9, wherein said further reducing the water content of the water-reduced water solution present in the at least one waste container comprises heating the water-reduced water solution present in the at least one waste container.

19. The method as claimed in claim 18, wherein said further reducing the water content of the water-reduced water solution present in the at least one waste container comprises boiling the water-reduced water solution present in the at least one waste container.

20. The method as claimed in claim 9, further comprising applying a pressure lower than ambient air pressure in the at least one waste container.

21. The method as claimed in claim 9, further comprising applying a pressure lower than ambient air pressure in the at least one vaporization chamber.

22. The method as claimed in claim 9, further comprising feeding a gas into the at least one waste container.

23. The method as claimed in claim 9, wherein said destructive treatment comprises an incineration process.

24. The method as claimed in claim 9, wherein water evaporated in the at least one vaporization chamber is released, optionally after condensation, into an ambient system.

\* \* \* \* \*